Sept. 10, 1940.  J. H. McKEE  2,214,338
METHOD OF MAKING AIRCRAFT PROPELLER BLADES
Filed June 11, 1936  6 Sheets-Sheet 1
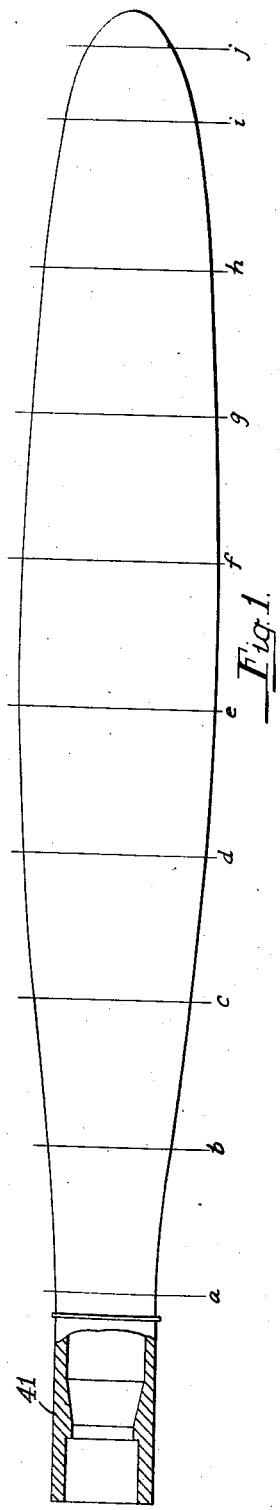
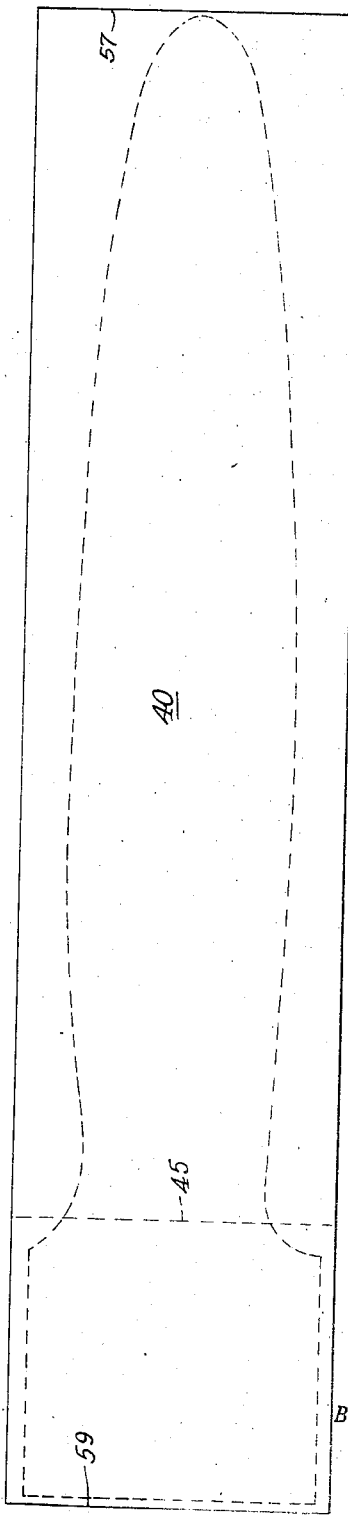
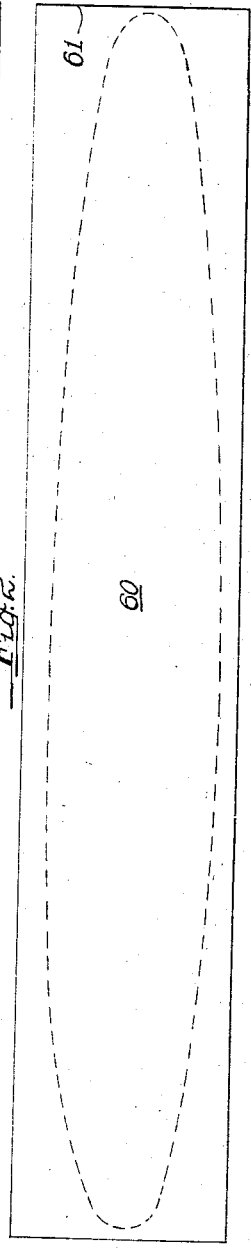
INVENTOR.
James H. McKee
BY Green & McCallister
His ATTORNEYS.

Sept. 10, 1940.   J. H. McKEE   2,214,338
METHOD OF MAKING AIRCRAFT PROPELLER BLADES
Filed June 11, 1936   6 Sheets-Sheet 2
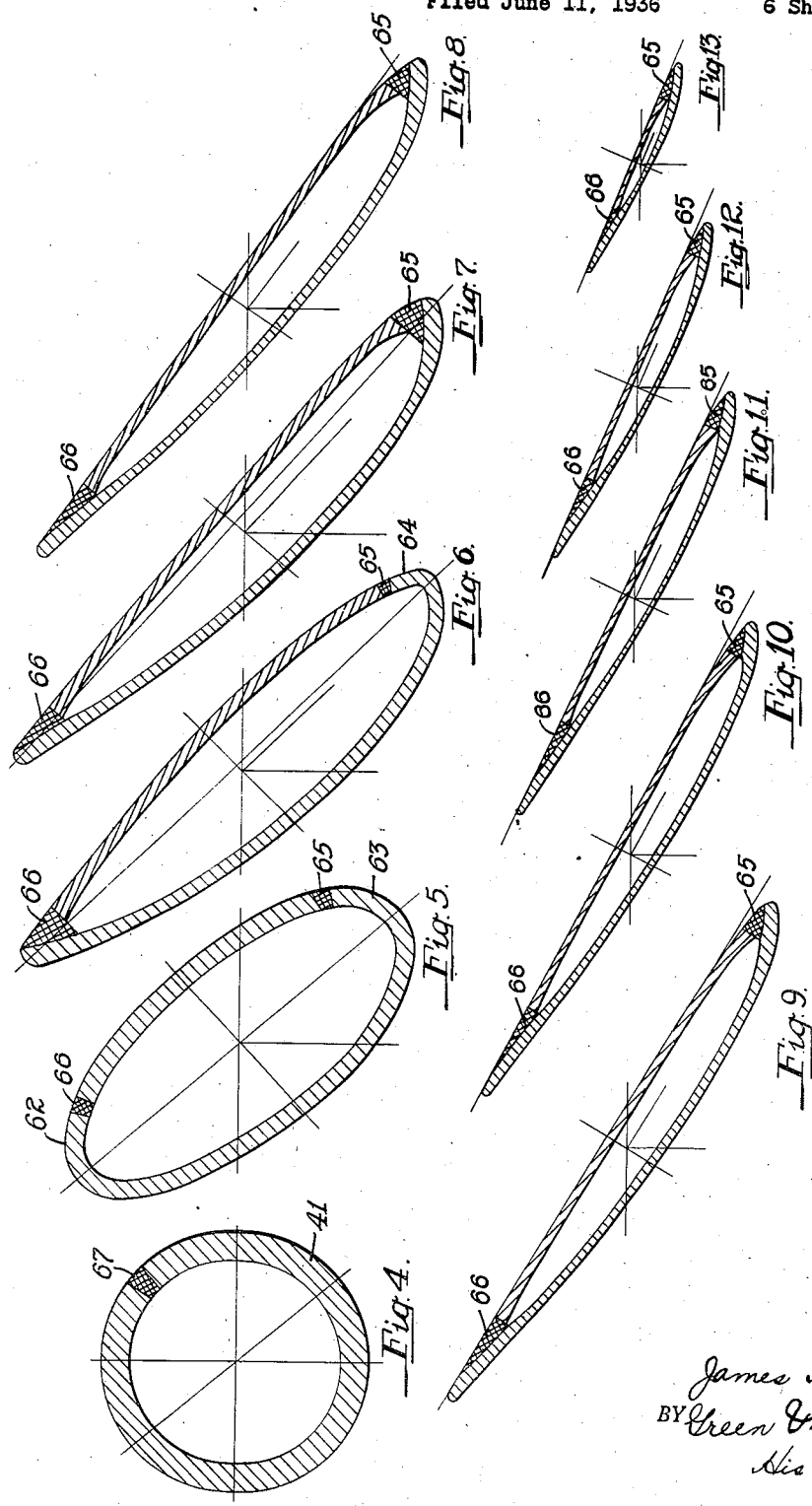
INVENTOR.
James H. McKee
BY Green & McCallister
His ATTORNEYS.

Sept. 10, 1940.  J. H. McKEE  2,214,338
METHOD OF MAKING AIRCRAFT PROPELLER BLADES
Filed June 11, 1936  6 Sheets-Sheet 3
Fig. 17.
Fig. 14.
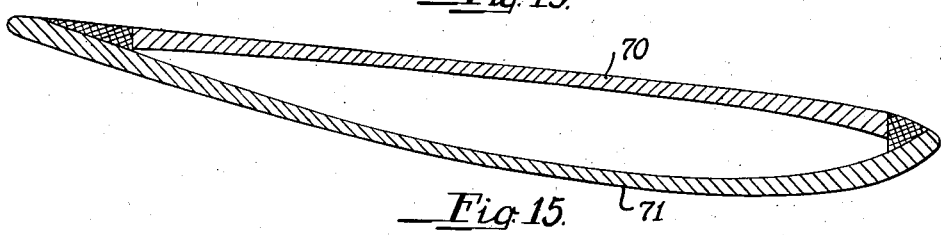
Fig. 18.
Fig. 19.
Fig. 15.
Fig. 20.
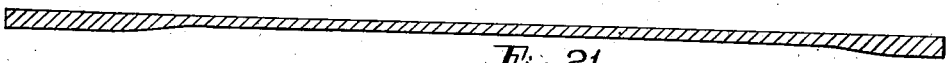
Fig. 21.
Fig. 16.
Fig. 22.
INVENTOR.
James H. McKee
BY Green & McCallister
His ATTORNEYS.

Sept. 10, 1940.   J. H. McKEE   2,214,338
METHOD OF MAKING AIRCRAFT PROPELLER BLADES
Filed June 11, 1936   6 Sheets-Sheet 4
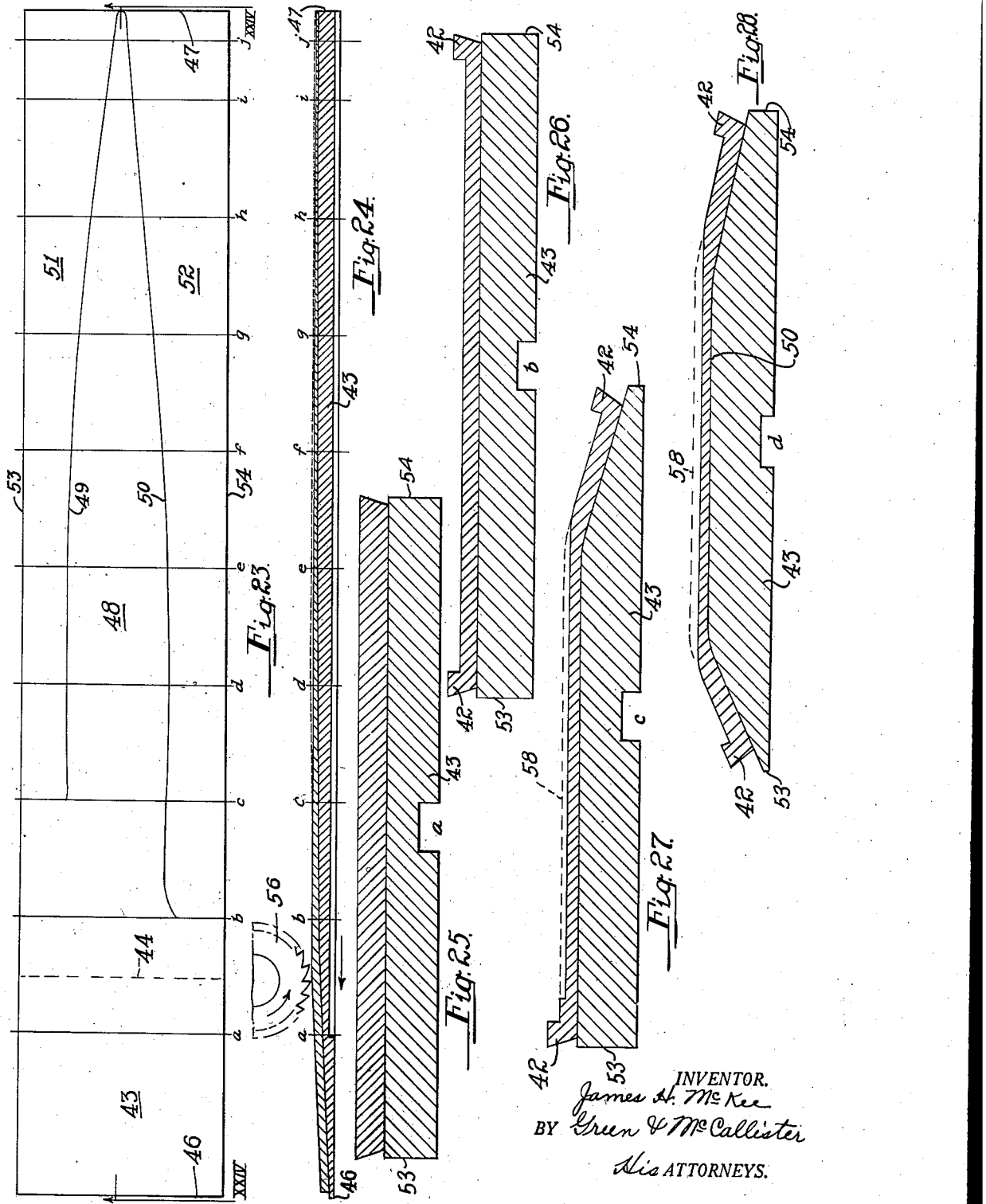

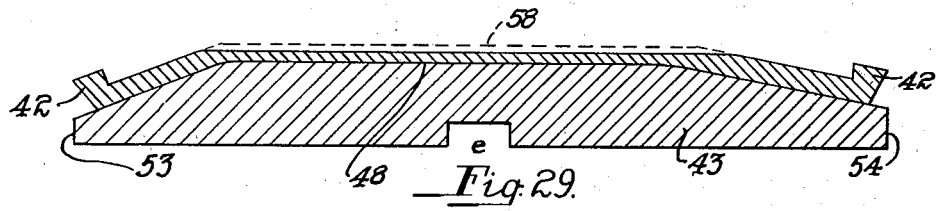
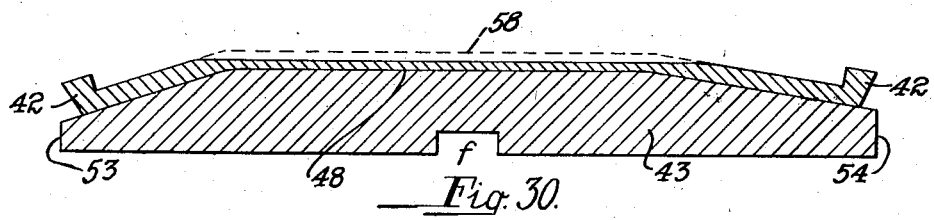
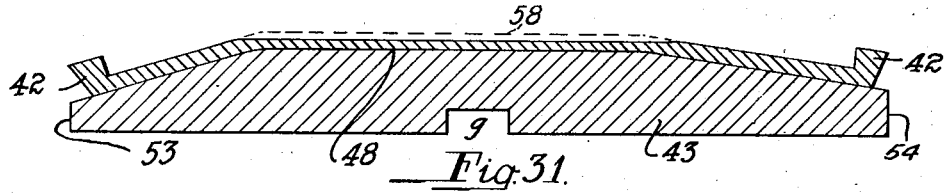
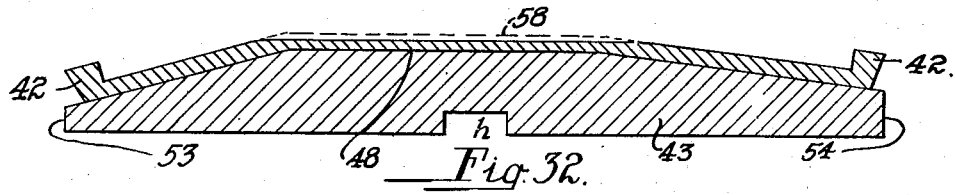
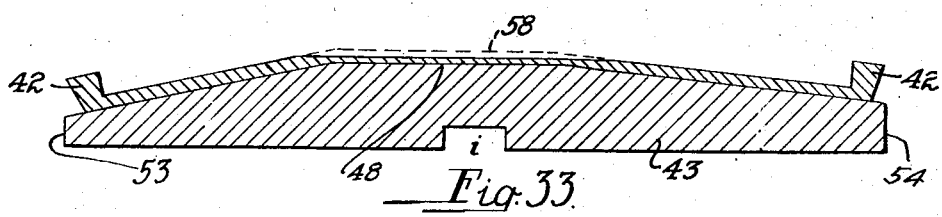
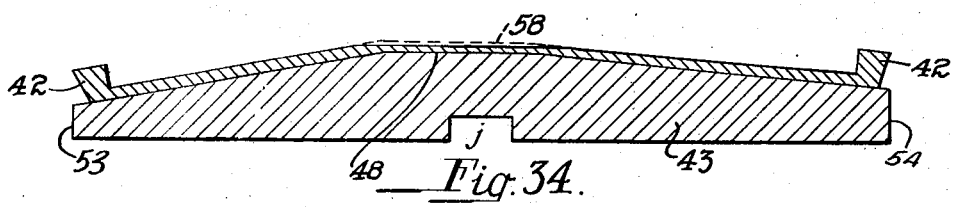

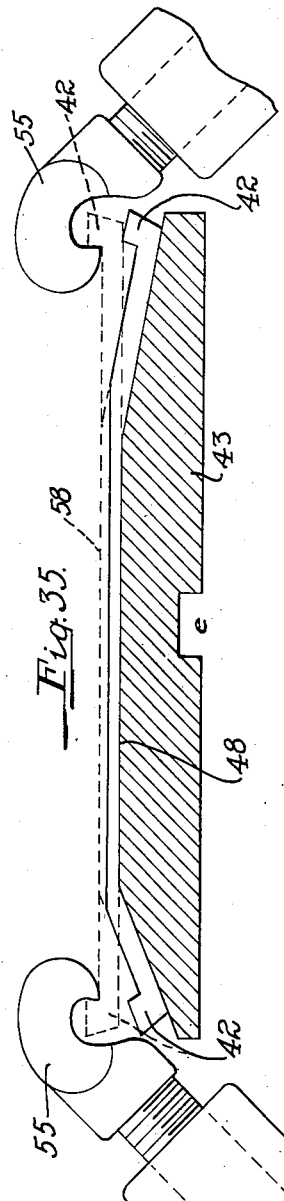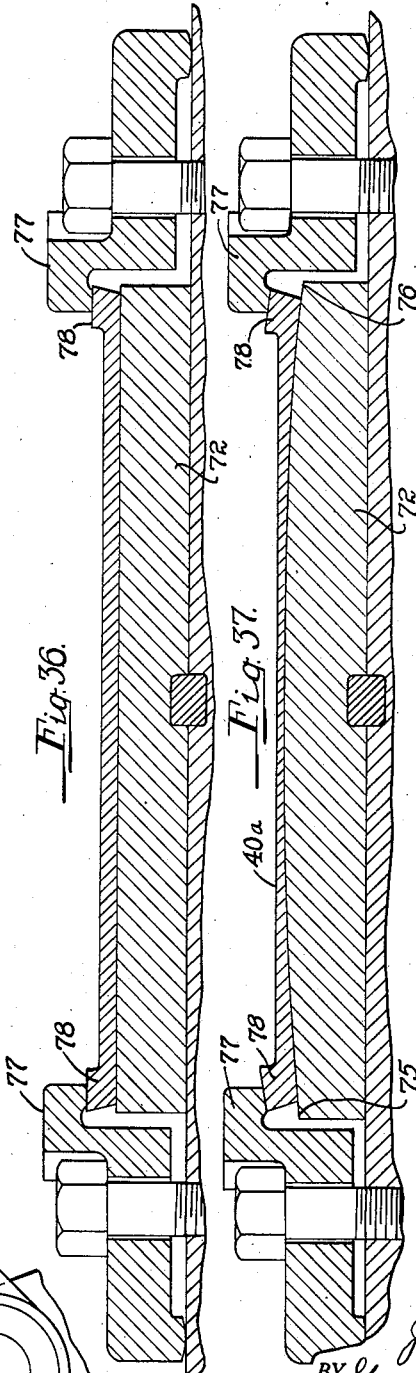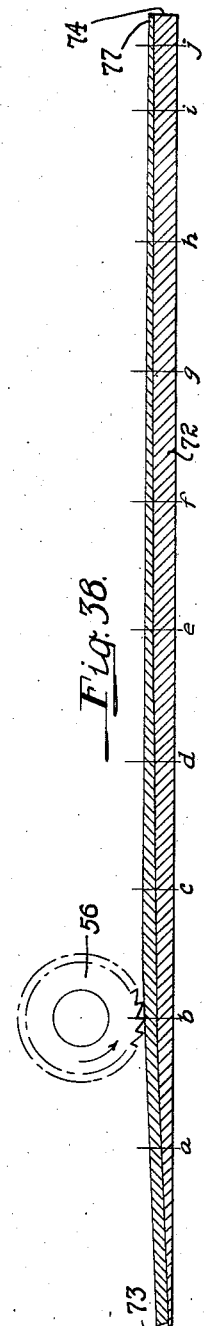

Patented Sept. 10, 1940

2,214,338

UNITED STATES PATENT OFFICE 2,214,338

METHOD OF MAKING AIRCRAFT PROPELLER BLADES

James H. McKee, Pittsburgh, Pa., assignor, by mesne assignments, to Curtiss-Wright Corporation, New York, N. Y., a corporation of Delaware Application June 11, 1936, Serial No. 84,698

26 Claims. (Cl. 29—156.8)

This invention relates to hollow metal blades for aircraft propellers and more particularly to a method of making such blades.

In T. A. Dicks Patent No. 1,713,500 of May 14, 1929, there is disclosed a hollow metal blade for aircraft propellers, formed from two relatively thin rolled metal blanks longitudinally tapered throughout the effective length of the blade. The blanks are formed into camber members and are joined together into the hollow blade structure by means of an inlaid metal weld which is located wholly within the pressure face of the blade and behind the leading edge thereof. In the Dicks blade, the inner and outer camber members at any station throughout the length of the blade are of uniform thickness from one longitudinal edge thereof to the other.

In an application filed by me and serially numbered 74,007, filed April 13, 1936, I have disclosed improvements over the blade of said Dicks patent. In said application, I disclose two forms of blade and in each form, the camber members at any station throughout the effective length of the blade are materially thicker at their edges than at their centers. Because of this improved construction, I am able, without materially increasing the weight of the blade, to produce blades that are much stronger and more rigid than the blade of said Dicks patent. The increased edge thickness of the camber members lowers the unit stresses in the high stress areas and materially facilitates the effective bonding of such members into the hollow blade structure, since, with the increased edge thickness, the weld bond areas increase in proportion to the increase in the blade section areas.

The method herein disclosed is suitable for the manufacture of any hollow metal blade for aircraft propellers when such blade is made from two camber members each of which at any transverse section throughout the major part of its length is materially thicker at its edge than at its center, and which are rigidly secured together into a hollow structure.

An object of this invention is to provide a new and improved method for the manufacture of hollow metal blades for aircraft propellers.

Another object of this invention is to provide a method of manufacturing hollow metal blades for aircraft propellers from two relatively thin metal blanks bonded together by fused metal and in which the bonding areas increase in proportion to the increase in the blade section areas.

Another object of this invention is to provide a method of manufacturing a hollow metal aircraft propeller blade from two relatively thin tapered metal blanks joined together by fused bonding metal and in which the bond areas increase in proportion to the increase in the blade section areas.

A further object of this invention is to provide a method of manufacturing a two-piece hollow metal aircraft propeller blade in which such pieces are bonded together by fused metal which lies either wholly within one face of the blade or within the leading and trailing edges of the blade or partly within one edge and partly within one face of the blade.

A still further object of this invention is to provide a relatively cheap and efficient method of making hollow metal aircraft propeller blade camber members which throughout a substantial part of their length are longitudinally tapered and which at any transverse section throughout their tapered portion are materially thicker at their edges than at their centers.

A still further object of this invention is to provide a relatively cheap and efficient method of making hollow metal aircraft propeller blade camber members which are longitudinally tapered throughout the major portion of their length and which at any transverse section thereof gradually increase in thickness in opposite directions from a point adjacent the c. g. line of the blade to the side edges thereof.

These, as well as other objects, I attain by means of the method described in the specification and illustrated in the drawings accompanying and forming part of this application and throughout which similar elements are denoted by like characters.

In the drawings:

Figure 1 is a plan view of a finished hollow metal blade for aircraft propellers constructed in accordance with the method of this invention. A portion of the shank of the blade is shown in section;

Fig. 2 is a top plan view of a blank from which to form a camber member and this view discloses by dotted outline one form of rudimentary outer camber member and shank forming portion adapted to be punched from the blank after the same has been processed in accordance with this invention to provide the desired surface contour;

Fig. 3 is a top plan view of a blank from which to form a camber member and discloses by dotted outlines one form of rudimentary inner camber member;

Figs. 4–13 inclusive are transverse sections at stations A–J inclusive of the blade of Fig. 1;

Fig. 14 is a typical transverse section of a modified form of blade constructed in accordance with the method of this invention;

Fig. 15 is a typical transverse section of another modified form of blade constructed in accordance with the method of this invention;

Fig. 16 is a typical transverse section of still another modified form of blade constructed in accordance with the method of this invention;

Fig. 17 is a transverse section of the inner camber member blank from which to form the inner camber member for the blade of Fig. 14 and Figs. 4 to 13 inclusive;

Fig. 18 is a transverse section of the outer camber member blank from which to form the outer camber member of the blade of Fig. 14 and Figs. 4 to 13 inclusive;

Fig. 19 is a view similar to Fig. 17, but of the camber member blank for the blade of Fig. 15;

Fig. 20 is a transverse section of the outer camber member blank for the blade of Fig. 15;

Figs. 21 and 22 are transverse sections of the inner and outer camber member blanks respectively for the blade of Fig. 16;

Fig. 23 is a top plan view of a milling plate over which the camber member blanks are transversely bent preparatory to the milling operations which give to the blanks the desired surface contour prior to the time when the rudimentary camber members are punched therefrom. The same milling plate is adapted to be utilized in processing the blanks for the inner and outer camber members;

Fig. 24 is a longitudinal vertical section taken on the center line of the milling plate shown in Fig. 23 with the blank for the outer camber member shown clamped in position thereon with a milling cutter diagrammatically illustrated in starting position above the same, but with the blank milled. The original blank thickness at the milled portion is indicated by the dotted line.

Figs. 25–34 inclusive are enlarged transverse sections of the milling plate and blank taken at the stations indicated below the center of each section with the original blank thickness indicated by the dotted lines;

Fig. 35 diagrammatically illustrates one method of clamping the blanks in position on the milling plate;

Figs. 36 and 37 are transverse sections of the milling plate utilized for carrying out the method of this invention when processing the camber member blanks such as disclosed in Figs. 19 and 20 for the blade of Fig. 15; and Fig. 38 is a longitudinal section on the center line of the milling plate and blank of Figs. 36 and 37.

In a general way in making a hollow blade for aircraft propellers in accordance with the method of this invention, I longitudinally taper throughout the major portion of their length two rectangular relatively thin rolled metal blanks. Each of these tapered blanks is then transversely bent throughout the major part of its tapered portion so that its longitudinal edges throughout such portion are offset downwardly with relation to the longitudinal center thereof. An area extending throughout the length of the bent portion is then subjected to a milling operation, which reduces its thickness. The blanks after this milling operation are then trimmed, preferably by punching, to the form of outer and inner rudimentary camber members. These rudimentary members are then die pressed so as to give to the same the approximate surface contour desired in the finished blade. The members are then united into a hollow rigid blade structure by fused bonding metal.

In some forms of blades, this fused bonding metal takes the form of an inlaid metal weld as disclosed in said Dicks patent while in other forms wherein the bounding edges of the camber members lie on opposite sides of the leading and trailing edges of the blade, brazing metal, used in a brazing procedure constitutes the fused bonding metal, the brazing metal occupying a position between the adjacent edge faces of the camber members, or the camber members may be bonded together by a flash welding procedure.

In making one form of blade in accordance with the method of this invention, each of the longitudinally tapered blanks is transversely bent in such manner as to provide a centrally disposed relatively flat area extending throughout the major part of the bent portion with the edge portions of the blank on opposite sides of said area offset or angularly disposed below said relatively flat area. A straight milling cut parallel with the bottom of the milling plate is then made throughout the length and breadth of the relatively flat area thus reducing the thickness of the tapered blank throughout such area.

When a rudimentary camber member is punched from a blank processed in this manner, it will have a bounding edge which at any transverse section of said member is materially thicker than the central part of such member; that is, than the body of such member lying between such edge portions.

In making another form of blade, each of the longitudinally tapered blanks is transversely bent throughout the major portion of its length to an arc of a circle. The outer curved portion of the bent blank is then given a straight milling cut extending from side to side thereof and substantially throughout the length of the bent portion so as to provide a flat face which extends across the blank from one longitudinal edge to the other throughout the major part of its bent portion.

When a rudimentary camber member is punched from a blank processed in this manner, its thickness at any transverse section throughout the major part of its length gradually increases in opposite directions from a line adjacent its center line to its side edges.

While my application Ser. No. 74,007 discloses the bonding of the camber members into a hollow blade structure by means of a deposited or inlaid metal weld which lies wholly within the pressure face of the blade and behind the leading edge thereof as in said Dicks patent, the method of this application is not only applicable to the manufacture of blades in which the camber members are bonded together by such a deposited or inlaid metal weld, but it is applicable to the manufacture of blades of other types utilizing the same or other methods of bonding.

This invention relates more or less to a specific method of making hollow metal blades for aircraft propellers when such blades are formed from two relatively thin rolled metal blanks which are longitudinally tapered throughout the effective length of the blade, which are materially thicker at their edges than at their centers and which are bonded together into the blade structures by means of fused bonding metal.

As above set forth, Figure 1 is a plan view of a finished hollow metal blade for aircraft propellers constructed in accordance with the method of this invention. A portion of the shank of the blade is shown in section. This external view is the same for the different blade forms disclosed herein.

If the blade is of the type disclosed in Figs. 4–13 inclusive or in Figs. 14 and 15, that is of the type employing a deposited or inlaid metal weld for bonding the inner and outer camber members together and which lies wholly within the pressure face of the blade, the blanks from which the camber members are formed are preferably of different lengths as disclosed in Figs. 2 and 3 of the drawings.

In blades employing such an inlaid metal weld as disclosed in said Dicks patent and in my application Ser. No. 74,007, the tubular shank is formed in one piece with the outer camber member and the blank therefore from which such member is formed need be only slightly longer than the total length of the blade. The blank from which the inner camber member is formed need be only slightly longer than the length of the inner camber member.

In making the blade of Fig. 16 in which the inner and outer camber members are joined together along the edges of the blade by a flash welding procedure or by brazing metal which serves as the bonding metal and which is located within the leading and trailing edges of the blade, the blanks for both camber members are preferably of the same length and need be but slightly longer than the finished blade.

The blanks from which the camber members are formed are sheared from steel plates of the proper analysis and preferably of a thickness equal at least to the thickness of the thickest part of the shank of the blade. The blanks are preferably rectangular and are longitudinally tapered either by a milling operation or by taper rolling. The outer camber member is tapered from the shank forming portion thereof to its opposite end and the inner camber member is tapered from one end to the other. Both blanks are so tapered that the thickness thereof at any transverse section is that desired for the edge thickness of the camber member at a corresponding location.

In making an outer camber member for a blade of the form shown in Figs. 4–13 inclusive and Fig. 14 (which is an enlarged view of a typical section of such blade), a rectangular blank 40 of a uniform thickness somewhat greater than that desired in the finished shank portion 41 of the blade is sheared from a steel plate of the desired analysis. The blank is then longitudinally tapered from about twelve inches from one end thereof to its opposite end, leaving relatively narrow portions 42 of the original blank thickness extending along the longitudinal edges of the tapered portion as shown in Figs. 25–34 inclusive. The tapering is preferably done by a single milling operation.

After the blank has been longitudinally tapered it is then secured in position on a milling plate 43 which is preferably as long and as wide as the largest blank to be milled thereon. This milling plate, from a transversely extending line 44 (which is shown dotted and corresponds to line 45 at which the taper begins in the blank) inclines downwardly to end 46 and from said line 44 to its opposite end 47 the milling plate is flat at all transverse sections throughout an area 48 defined by curved lines 49 and 50. Beyond or outside of lines 49 and 50, the plate slopes away or downwardly to provide angularly disposed portions 51 and 52 which extend from flat area 48 to its longitudinal edges 53 and 54 as shown in Figs. 27–34 inclusive.

By means of clamping jaws 55 (preferably hydraulically operated) which are hooked over the upstanding edge portions 42 of the blank, the blank is drawn downwardly so that its under surface is made to conform as closely as possible to the upper surface of the milling plate. I find that it is advisable to supplement the outward and downward pressure exerted by the clamping jaws by using a heavy copper faced hammer to overcome the spring in the blank and bring all parts of the under surface of the same into contact with the upper surface of the milling plate. Other means may, if desired, be used to obtain this close contact.

When the blank is properly bent and securely clamped in position, a straight cut parallel with the bottom of the milling plate is taken by a milling cutter 56 from line 45 of the blank to its opposite end 57 whereby the flat area 58 throughout its length and breadth is reduced in thickness to the thickness desired in the camber member between its relatively thick marginal edge portions. The dotted lines in Figs. 27–34 inclusive indicate the original blank thickness before this cut is taken.

By downwardly inclining the upper surface of the milling plate in opposite directions from line 44 to its ends and bending the blank downwardly into contact with the plate, by means of simultaneously operated clamps such as shown in Figs. 36 and 37, the milling cutter 56 is cleared by the portion between end 59 and line 45 and its original thickness is reserved from its end 59 to line 45. The dotted line in Fig. 24 indicates the top of the blank along the longitudinal center line of the relatively flat area referred to before the milling cut is taken. Dotted line 58 in Figs. 27 to 34 inclusive indicates the top of the blank at stations C–J inclusive before the milling cut is taken. The milling plate which is secured to the bed of the milling machine by which the blank clamping jaws 55 are carried, is longitudinally reciprocated below the milling cutter 56, and, during the milling operation a straight cut is taken throughout the length of portion 58 of the blank in contact with area 48 of the milling plate.

By bending down the sides of the tapered portion of the blank into contact with angularly disposed surfaces 51 and 52 of the milling plate so as to clear the milling cutter, I obtain a gradual increase in thickness at all transverse sections of the blank between its thin body portion (its central area 58 corresponding to flat area 48 of the milling plate) and its edge portions as shown in Figs. 18 and 27–34. Figs. 4–14 show this blank after being die pressed into the outer camber member and bonded to the inner camber member by deposited or inlaid weld metal.

After the milling operation is completed and the blank is removed from the milling machine, it is ready to have the rudimentary outer camber member (indicated in dotted outline in Fig. 2) punched therefrom.

In making an inner camber member for a blade of Figs. 4–14 a rectangular blank 60 (Fig. 3) is sheared from the same or a similar plate from which blank 40 is sheared and is milled in the same manner as blank 40 but in the case of blank 60 it is tapered throughout its entire length. After milling, its end 61 is of the same thickness as end 57 of blank 40 for the outer camber member with the remainder of the blank varying in thickness in the same manner as the blank for the outer camber member blank varies. In other words, both blanks are of the same thickness at corresponding locations.

The inner camber member blank after being tapered, is clamped in position on milling plate 48 with its end 61 located above end 47 of the milling plate. Because of the fact that the blank for the inner camber member is shorter than the blank for the outer camber member it will only extend from edge 47 of the milling plate to a little beyond station b.

The blank is transversely bent in the same manner as the blank for the outer camber member and a straight milling cut is made from end to end of the blank so that its thickness at any transverse section throughout its area above area 48 of the milling plate corresponds to the thickness desired in the camber member between the relatively thick edge portions at corresponding locations. After the milling operation is completed and the blank is removed from the milling plate, it is ready to have the rudimentary inner camber member (shown by dotted outline in Fig. 3) punched therefrom.

In this type of blade, the major part of the pressure face of the blade is formed from the inner camber member, a small section by the inwardly bent portions 62, 63 and 64 (Figs. 5 and 6) of the outer camber member adjacent the shank end of the blade and the remainder by the inlaid metal welds (65 adjacent the leading edge of the blade and 66 adjacent the trailing edge) which entirely surround the inner camber member and form (as disclosed in Figs. 6-14) a substantial part of the pressure face of the blade.

The outline of area 48 of the milling plate must be designed for the blade which is to be manufactured. Since in the form of blade of Figs. 4-14 the body portion of the camber members, or that portion between the relatively thick edge portions, is of uniform thickness at all transverse sections, area 48 must be designed so as to provide, both as to contour and size, the desired uniform thickness-body portion of the camber members.

The milling cut taken on the bent camber member blanks is a straight cut and since the relatively flat area 58 inclines downwardly from transverse line d to end 57 in one direction and from said line d to transverse line c in the opposite direction, the percentage of increase in thickness of the edge portions over the center portion at all transverse sections is uniform throughout the milled part of the blanks.

After the bent blanks have been milled and removed from the milling machine, the rudimentary camber members, shown in dotted outline in Figs. 2 and 3 are punched therefrom. These members are then given the desired surface contour by forming dies and the shank forming portion of the outer camber member blank 40 is pressed or forged to tubular form.

In order to bond together the two camber members into a hollow rigid blade structure, such as disclosed in Figs. 2-14, the outer hollow camber member is supported in a horizontal position with its open side up. The inner camber member is then supported in proper relative position within the opening in the upper open side of the outer hollow camber member by means of a collapsible metal support which is positioned within the outer camber member and which is so constructed as to be capable of being removed through the end of the hollow shank portion after the welding operation is completed.

The inner camber member is held in position in contact with this collapsible support by means of a metal holddown device which contacts with the upper outer surface of the inner camber member. The two camber members are then raised to and maintained at a temperature sufficiently high to facilitate the welding operation wherein the weld metal is deposited to form the inlaid metal welds 65 and 66 which surround the inner camber member and inlaid metal weld 67 which extends longitudinally of the shank 41. The inlaid metal welds 65 and 66, as disclosed in the drawings, form a margin of substantial width extending entirely around the inner camber member and lie between its outer edge and the inner surface of the adjacent portions of the outer camber member. The single weld joint 67 of shank 41 joins the marginal welds at a point between stations A and B where these marginal welds join.

The welding operation is preferably carried out by the atomic hydrogen method and I preferably use a welding rod of the same analysis as that of the blanks from which the camber members are formed. After the welding operation has been completed and the collapsible support has been withdrawn from the interior of the hollow blade structure, the blade is heat treated to remove strains and is subjected to the necessary finishing operations. During these operations the excess weld metal which projects beyond the blade face is removed and the blade shank is completed and finished to fit the hub with which it is to be used.

In the blade of Fig. 16 (this being a typical transverse section taken at station f of the blade of Fig. 1), the inner and outer camber members 68 and 69 are of substantially the same size and the blanks from which they are made, like blank 40 of Figure 2 need be but slightly longer than the overall length of the finished blade.

The joints between the camber members, as disclosed in this figure, are located in the leading and trailing edges of the blade and, as will be apparent, extend throughout the length of the blade including its shank.

Milling plate 43 is used in milling the blanks for this blade and both blanks are milled in the same way as the outer camber member blank 40 is milled. The original blank thickness at the shank end is maintained. The rudimentary camber members to be punched from the blanks will be slightly different from that shown in Figure 2 as will be apparent, since half of the shank of the blade is formed from each camber member blank instead of being formed entirely from the outer camber member blank as in the blade of Figures 4-14.

After the rudimentary camber members have been punched from the blanks and die pressed to give to the same the desired surface contour, the edges of the pressed blanks are so milled or ground that when the camber members are placed together in the position they are to occupy in the finished blade, their adjacent edge faces will lie in contact one with the other throughout the entire length of the blade.

In this form of blade the two camber members may be bonded together by any suitable method.

In the blade of Figure 15 (this being a typical transverse section at station f of the blade of Fig. 1) while each camber member 70 and 71 is materially thicker at its bounding edges than at its longitudinal center line, it gradually increases (at all transverse sections thereof throughout the major portion of the effective length of the blade) in opposite directions from its longitudinal center to the edges as clearly shown in Figs. 19 and 20; Fig. 19 being a transverse section of the inner rudimentary camber member before being die pressed and Fig. 20 being a transverse section of the outer rudimentary camber member at such station before being die pressed.

The blanks from which to form the camber members for the blade of Fig. 15, are identical with blanks 40 and 60. These blanks, instead of being milled on milling plate 43 are milled upon a milling plate 72 which as disclosed in Figs. 36, 37 and 38, is flat from side to side from end 73 to station b, but is inclined downwardly from station b to its end 73 (Fig. 38). From station c to its end 74 its upper surface (Fig. 37) is curved from one longitudinal edge 75 to the other longitudinal edge 76 on the arc of a circle (Fig. 37). The curved surface merges with the flat surface between stations b and c.

Along its longitudinal center line, this curved portion of plate 72 gradually increases in thickness from a point adjacent station B to its end 74.

The blank is held in position on the milling plate 72 and caused to conform to the upper surface thereof by clamping hold-down jaws 77 (Figs. 36 and 37). If desired, these jaws may be so arranged as to be operated hydraulically and simultaneously. After the blank is secured in position a straight milling cut is taken from station b to end 77 or that end adjacent end 74 of the milling plate. This milling cut extends from side to side of the blank except for narrow upstanding edge portions 78 which extend from station b to end 77 along the longitudinal edges of the blank. The plane of the flat face produced by the milling cut either cuts or intercepts the longitudinal edges of the bent or curved portion of the blank.

The outer camber member blank is shown in position on the milling plate in Figs. 36 and 37 and the blank is shown as it appears after the milling cut has been completed.

The shank of the blade of Fig. 15 is formed from the outer camber member blank as in the blade of Figs. 4–14 and the original thickness of the blank at the shank forming portion is therefore preserved during the milling operation. This is accomplished by bending down the shank forming portion to clear the milling cutter during the milling operation as shown in Fig. 38.

The inner camber member blank corresponding to blank 60 when placed on the milling plate 72 only extends from end 74 of the milling plate to station b since the inner camber member as in the blade of Figures 4–14 is positioned within the opening in the open side of the hollow outer camber member and, as shown in Figure 15, is welded in position by deposited or inlaid metal welds, as in the blade of Figures 4–14.

The outlines of the rudimentary outer and inner camber members for the blade 15 are the same as the outlines for the rudimentary camber members of the blade of Figures 4–14 which are indicated by the dotted outline in each of Figs. 2 and 3.

After the blanks are milled and removed from the milling machine, the rudimentary camber members are punched therefrom. These are then die pressed to give to the same the desired camber member contour. The tubular shank is formed from the shank forming portion of the outer rudimentary camber member either by pressing or forging and the camber members are welded together into a rigid hollow blade structure in the same manner as set forth in connection with the blade of Figs. 4–14 inclusive. After the welding operation is completed, the blade is heat treated to remove strains and is finished and then balanced.

The thickness of the blanks at any transverse section thereof throughout the major part of the tapered portion must be that desired in the edge portions of the camber members at corresponding sections.

In Fig. 24, the dotted line indicates the center of the flat area of the blank 40 for the outer camber member before the milling cut is made. The sectioned portion of the blank depicts the finished blank after the milling operation is completed.

It will be apparent that by providing thickened edges for the camber members in accordance with the method disclosed herein, I have not only materially increased the weld bond areas over those possible in a blade of the same size and weight when constructed from camber members such as disclosed in the Dicks patent, but I accomplish this in an extremely simple and efficient manner.

I have referred to the blades disclosed herein as being formed from, or as comprising, outer and inner camber members and for the purpose of this application, that member or plate in a hollow two-part blade structure, the outer face of which forms the suction face of the blade is an outer camber member and that member or plate the outer face of which forms the thrust or pressure face of the blade is an inner camber member regardless of whether it is located within the opening in the open side of the hollow outer camber member as in the blade of Figs. 4–15 inclusive or is of substantially the same size as the outer camber member.

Having thus described my invention, what I claim as new and desire to secure by Letters Patent is:

1. In the manufacture of a hollow aircraft propeller blade, the steps which consist in longitudinally tapering two relatively thin metal blanks, in transversely bending each of said blanks throughout the major portion of its length, in taking a straight cut throughout the major part of the length of said bent portion whereby the blank is reduced in thickness throughout that portion thereof in which such cut is made, in forming said blanks into camber members and in uniting said members into a hollow rigid blade structure by fused bonding metal.

2. In the manufacture of a hollow aircraft propeller blade, the steps which consist in longitudinally tapering two relatively thin metal blanks, in transversely bending each of said blanks throughout the major portion of its length, in taking a straight milling cut off the outer side of such bent portion and throughout the major part of its length, in punching a rudimentary camber member from each of said blanks, in pressing each rudimentary camber member into the form of a camber member and then in uniting said camber members by fused bonding metal.

3. In the manufacture of a hollow aircraft propeller blade, the steps which consist in longitudinally tapering two relatively thin metal blanks, in transversely bending each of said blanks throughout the major portion of its length to provide a relatively flat area between its longitudinal edges throughout the major part of said bent portion with the edge portions on opposite sides of said flat area angularly disposed below the same, in taking a straight cut throughout the length of said area and extending from side to side thereof whereby the blank throughout said area is reduced in thickness, in forming said blanks into camber members and in uniting said members into a hollow rigid blade structure by fused bonding metal.

4. In the manufacture of a hollow aircraft propeller blade, the steps which consist in longitudinally tapering two relatively thin metal blanks, in transversely bending each blank throughout the major portion of its length to provide a relatively flat area between its longitudinal edges extending throughout the major part of said bent portion with the edge portions on opposite sides of said flat area disposed below the same, in reducing the thickness of said relatively flat area, in forming said blanks into camber members and in uniting the same into a hollow rigid blade structure by fused bonding metal.

5. In the manufacture of a hollow aircraft propeller blade, the steps which consist in longitudinally tapering two metal blanks, in transversely bending each blank throughout a substantial portion of its length to provide a relatively flat area lying between its longitudinal edges with the edge portions on opposite sides of said area angularly disposed below the same, in reducing the thickness of said flat area, in forming said blanks into camber members and in uniting said members into a hollow rigid blade structure by means of an inlaid metal weld.

6. In the manufacture of a hollow aircraft propeller blade, the steps which consist in longitudinally tapering two metal blanks, in transversely bending each blank throughout a substantial portion of its length to provide a relatively flat area between its longitudinal edges with the edge portions on opposite sides of said area offset with relation thereto, in removing metal throughout the length and breadth of said flat area, in trimming said blanks, in pressing said trimmed blanks into camber members and in uniting the same into a hollow rigid blade structure by intervening fused bonding metal.

7. In the manufacture of a hollow aircraft propeller blade, the steps which consist in longitudinally tapering two relatively thin metal blanks, in transversely bending each of said blanks throughout the major portion of its length to provide a relatively flat area extending throughout the length of the bent portion and lying intermediate its longitudinal edges with edge portions on opposite sides thereof disposed below the flat area, in milling the flat area to reduce its thickness, in trimming said blanks, in pressing said blanks into camber members and in uniting said members into a hollow rigid blade structure by fused bonding metal.

8. In the manufacture of a hollow aircraft propeller blade, the steps which consist in longitudinally tapering two relatively thin metal blanks, in transversely bending each blank throughout a substantial portion of its length to an arc of a circle, in providing the bent portion of each blank with a flat outer side by removing that part of said blank which is located between its outer curved face and a plane which lies within the blank and passes through the longitudinal edges of its bent portion, in forming said blanks into camber members and in uniting the said members into a hollow rigid blade structure by fused bonding metal.

9. In the manufacture of a hollow aircraft propeller blade, the steps which consist in longitudinally tapering two relatively thin metal blanks, in transversely bending each blank throughout a substantial portion of its length to an arc of a circle, in providing the bent portion of each blank with a flat outer side by removing that part of said blank on its convex side to a plane lying within the curved portion of the blank and which contacts with the longitudinal edges of the same throughout the major part of its curved portion, in forming said blanks into camber members and in uniting the said members into a hollow rigid blade structure by means of fused bonding metal.

10. In the manufacture of a hollow aircraft propeller blade, the steps which consist in longitudinally tapering two metal blanks, in transversely bending each blank throughout a substantial portion of its length to an arc of a circle, in providing said bent portion with a flat outer side by removing that part of said blank which is located between its outer curved face and a plane located within the blank and which meets the longitudinal edges of its bent portion, in forming said blanks into camber members and in uniting the said members adjacent their edges into a hollow rigid blade structure by means of fused bonding metal.

11. In the manufacture of a hollow aircraft propeller blade, the steps which consist in longitudinally tapering two relatively thin metal blanks, in transversely bending each blank throughout a substantial portion of its length to an arc of a circle, in providing the bent portion of each blank with a flat outer side by milling off that part which is located between its outer curved face and a plane located within the blank and which meets the longitudinal edges of its bent portion, in forming said blanks into camber members and in uniting the said camber members into a hollow rigid blade structure by fused bonding metal.

12. In the manufacture of a hollow aircraft propeller blade, the steps which consist in longitudinally tapering two metal blanks, in transversely bending each of said blanks throughout a substantial portion of its length to an arc of a circle, in milling off the outer curved surface to provide a flat face of substantially the same area as the concave face of its bent portion, in trimming said blanks, in pressing the same into camber members and in uniting said camber members into a rigid hollow blade structure by fused bonding metal.

13. In the manufacture of a hollow aircraft propeller blade, the steps which consist in longitudinally tapering two relatively thin metal blanks, in transversely bending each of said blanks throughout a substantial portion of its length to an arc of a circle, in removing sufficient metal from the curved outer portion of the blank to provide a flat face of substantially the same area as the concave face of its bent portion, in punching rudimentary camber members from said blanks, in pressing said members into camber members and in bonding said camber members into a rigid hollow blade structure by fused metal.

14. In the manufacture of a camber member for a hollow aircraft propeller blade, the steps which consist in longitudinally tapering a relatively thin metal blank, in transversely bending said blank throughout the major portion of its length, in taking a straight cut throughout the major part of the length of said bent portion whereby the blank is reduced in thickness throughout that portion thereof in which such cut is made and in forming said blank into a camber member.

15. In the manufacture of a camber member for a hollow aircraft propeller blade, the steps which consist in longitudinally tapering a relatively thin rolled metal blank, in transversely bending said blank throughout the major portion of its length, in taking a straight milling cut off the outer side of such bent portion and throughout the major part of the length thereof, in punching a rudimentary camber member from such blank and in pressing such member into the form of a camber member.

16. In the manufacture of a camber member for a hollow aircraft propeller blade, the steps which consist in longitudinally tapering a relatively thin metal blank, in transversely bending such blank throughout the major portion of its length to provide a relatively flat area between its longitudinal edges throughout the major part of said bent portion with the edge portions on opposite sides of said flat area angularly disposed with relation thereto, in taking a straight cut throughout the length of said area and extending from side to side thereof whereby the blank throughout said area is reduced in thickness, in trimming said blank to form a rudimentary camber member and in die pressing said trimmed blank to the desired contour.

17. In the manufacture of a camber member for a hollow aircraft propeller blade, the steps which consist in longitudinally tapering a relatively thin metal blank, in transversely bending the same throughout the major portion of its length to provide a relatively flat area between its longitudinal edges extending throughout the major part of said bent portion with the edge portions on opposite sides of said flat area offset with relation thereto, in reducing the thickness of said relatively flat area, in punching a rudimentary camber member from said blank and in pressing said rudimentary member to the desired contour.

18. In the manufacture of a camber member for a hollow aircraft propeller blade, the steps which consist in longitudinally tapering a metal blank, in transversely bending the same throughout a substantial portion of its length to provide a relatively flat area between its longitudinal edges with the edge portions on opposite sides thereof offset with relation thereto, in removing metal throughout the length and breadth of said flat area, in trimming said blank and in pressing the same into a camber member.

19. In the manufacture of a camber member for a hollow aircraft propeller blade, the steps which consist in longitudinally tapering a relatively thin metal blank, in transversely bending the same throughout a substantial portion of its length to an arc of a circle, in providing the bent portion of each blank with a flat outer side by removing that part of said blank which is located between its outer curved face and a plane which lies within the blank and meets the longitudinal edges of its bent portion, in trimming said blank and in pressing the same to the desired contour.

20. In the manufacture of a camber member for a hollow aircraft propeller blade, the steps which consist in longitudinally tapering a relatively thin metal blank, in transversely bending the same throughout a substantial portion of its length to an arc of a circle, in providing the bent portion of each blank with a flat outer side by removing that part of said blank on its convex side to a plane lying within the curved portion of the blank and which contacts with its longitudinal edges throughout the major part of its curved portion, in trimming said blank and in die pressing the same to the desired contour.

21. In the manufacture of a camber member for a hollow aircraft propeller blade, the steps which consist in longitudinally tapering a relatively thin rolled metal blank, in transversely bending the same throughout a substantial portion of its length to an arc of a circle, in providing the bent portion of each blank with a flat outer side by milling off that part which is located between its outer curved face and a plane located within the blank and which meets the longitudinal edges of its bent portion, in trimming said blank and in giving to the same the desired surface contour.

22. In the manufacture of a camber member for a hollow aircraft propeller blade, the steps which consist in longitudinally tapering a relatively thin metal blank, in transversely bending the same throughout a substantial portion of its length, in milling off the outer portion thereof to provide a flat face of substantially the same area as the curved face of its bent portion, in trimming said blank and in pressing the same into the form of a camber member.

23. In the manufacture of a camber member for a hollow aircraft propeller blade, the steps which consist in transversely bending a relatively thin metal blank throughout a substantial portion of its length, in taking a straight milling cut throughout the major part of the length of said bent portion whereby the blank is reduced in thickness throughout that portion thereof in which said cut is made, and in forming said blank into a camber member.

24. In the manufacture of a camber member for a hollow aircraft propeller blade, the steps which consist in transversely bending a relatively thin metal blank throughout a substantial portion of its length, in taking a straight milling cut off the outer side of such bent portion and throughout the major part of the length thereof, in punching a rudimentary camber member from such blank, and in pressing such member into the form of a camber member.

25. In the manufacture of a camber member for a hollow aircraft propeller blade, the steps which consist in transversely bending a relatively thin metal blank throughout a substantial portion of its length to provide a relatively flat area between its longitudinal edges extending throughout the major part of said bent portion with the edge portions on opposite sides of said flat area offset with relation thereto, in reducing the thickness of said relatively flat area, in punching a rudimentary camber member from said blank, and in pressing said rudimentary member to the desired contour.

26. In the manufacture of a camber member for a hollow aircraft propeller blade, the steps which consist in transversely bending a metal blank throughout a substantial portion of its length to provide a relatively flat area between its longitudinal edges with the edge portions on opposite sides thereof offset with relation thereto, in removing metal throughout the length and breadth of said flat area, in trimming said blank, and in pressing the same into a camber member.

JAMES H. McKEE.